INVENTORS.
ROBERT W. WEBER
BRUCE J. CORDARY
BY
Christie, Parker & Hale
ATTORNEYS.

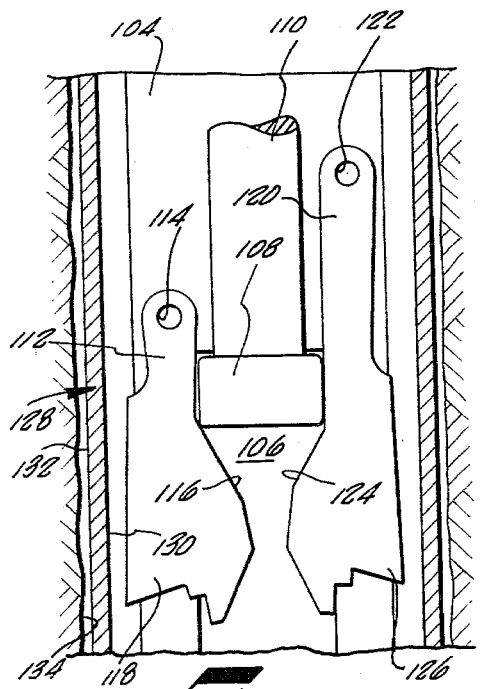
FIG_2_
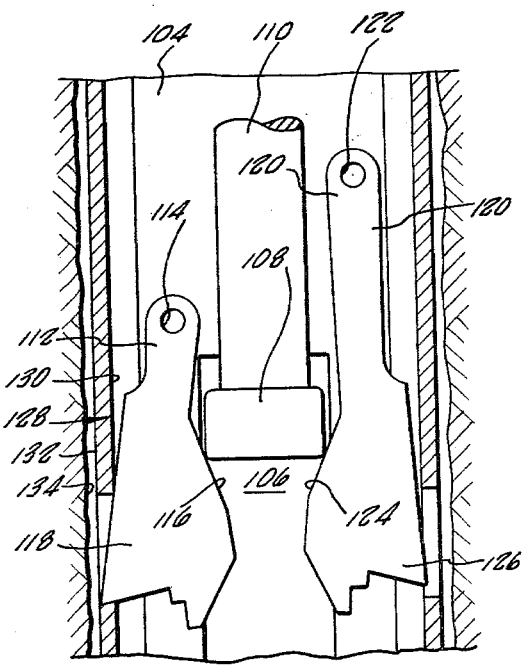
FIG_4_
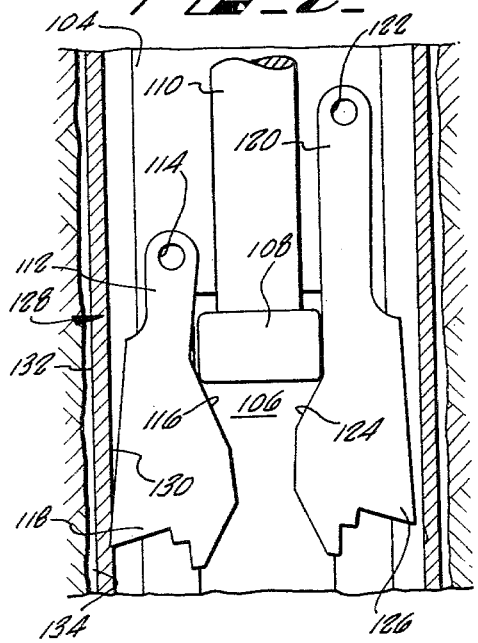
FIG_3_
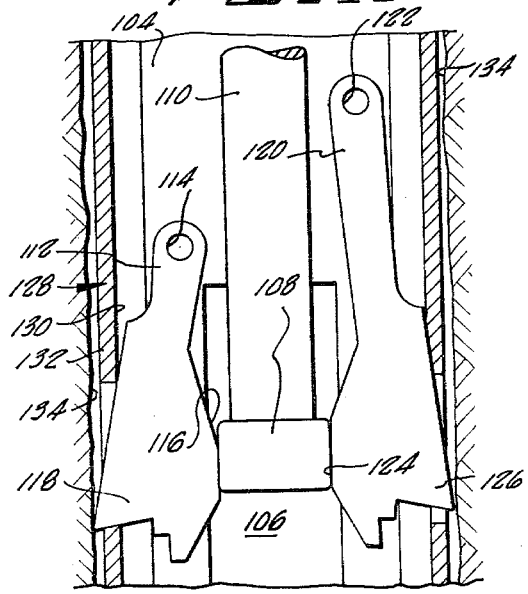
FIG_5_

United States Patent Office 3,195,636
Patented July 20, 1965

3,195,636
APPARATUS FOR CUTTING AND MILLING IN WELL BORES
Bruce J. Cordary, Los Alamitos, and Robert W. Weber, Long Beach, Calif., assignors to The Servco Company, Long Beach, Calif., a corporation of Nevada
Filed Sept. 7, 1962, Ser. No. 222,052
8 Claims. (Cl. 166—55.8)

This invention relates to a subsurface well bore apparatus and particularly to an apparatus for cutting and milling tubular conduits disposed in well bores.

It frequently becomes necessary in operations in well bores to cut and mill subsurface tubular conduits, such as liners and casings. This includes cutting and milling of a section of such tubular conduit to form a "window" by removal of a portion of the tubular conduit. The latter operation requires a tool having expandable cutter arm adapted to be in a retracted position during passage of the tool down the well bore and to be expanded into a cutting and milling position at a desired depth. Such tools, often referred to as "section mills," known to the prior art, as shown, for example, in the embodiment of such a tool in FIG. 1 of U.S. Patent No. 2,846,193.

The present invention is for an improvement in milling cutters known as section mills. The present invention is an apparatus for cutting and milling a tubular conduit disposed in a well bore comprising a tubular body adapted to be secured to a drill string and having a passage. A piston is reciprocably movable within the passage. Each of a first plurality and a second plurality of depending cutter arms is secured to the tubular body and adapted to occupy a retracted position and an expanded position. Openings are provided in the tubular body to accommodate the arms so that a portion of each arm extends inwardly into the passage. Each arm includes means that are engageable upon reciprocating movement of the piston. These means are positioned on the first plurality and the second plurality of cutter arms for successive engagement by movement of the piston to produce radially outward movement of the first plurality of arms to the expanded position prior to radially outward movement of the second plurality of arms to the expanded position.

In operation, the apparatus of the present invention is secured to a drill string and lowered to a predetermined depth within the well bore with its cutter arms in a retracted position. The piston is actuated to move downwardly and to engage the means of the first plurality of arms by which this plurality of cutter arms is moved radially outwardly to an expanded position to engage the tubular conduit to be cut and milled within the well bore. Continued downward movement of the piston then successively engages the means of the second plurality of arms by which these cutter arms are moved radially outwardly to engage the tubular conduit. By the apparatus of the invention, the first plurality of cutter arms engages the tubular conduit to commence cutting of it prior to engagement of the conduit by the second plurality of cutter arms. Preferably, the second plurality of cutter arms engage the tubular conduit before the first plurality of cutter arms cut through the tubular conduit. Thereupon, both pluralities of arms function to cut and mill the conduit.

The apparatus of the present invention achieves improved milling and cutting preformance in well bores. By reason of its structure, the over-all advantages of utilization of a plurality of cutter arms are derived. At the same time, the load that can be applied to each arm of the first plurality of arms during initial cutting of the tubular conduit is greatly increased as compared to devices having an equal plurality of cutter arms but in which all cutter arms of the tool simultaneously engage the conduit. The increased applied load enables more rapid initial cutting of the tubular conduit. Furthermore, the apparatus of the invention alleviates the consequences of "blow-through" of cutter arms, i.e., the breaking through of cutters when initial cutting of the conduit reduces the conduit wall to a small thickness. Because of the lag of the second plurality of cutters, any blow-through of the first plurality of cutter arms is limited, and binding or sticking of the apparatus is minimized.

The structure of the apparatus of the present invention together with its advantages and method of operation will become more apparent from the following detailed description made in conjunction with the accompanying drawings in which:

FIG. 2 is a schematic elevational view of the embodiment of the milling cutter of FIG. 1 within a well bore, showing it in a retracted position;

FIG. 3 is a schematic view in accordance with FIG. 2, showing the milling cutter at the point when a tubular conduit is initially engaged by the first plurality of cutter arms;

FIG. 4 is a schematic view in accordance with FIG. 2, showing the milling cutter at the point when the first plurality has cut through the conduit and the second plurality of arms has begun to engage the tubular conduit; and FIG. 5 is a schematic view in accordance with FIG. 2, showing the milling cutter in final milling position.

Figure 1:
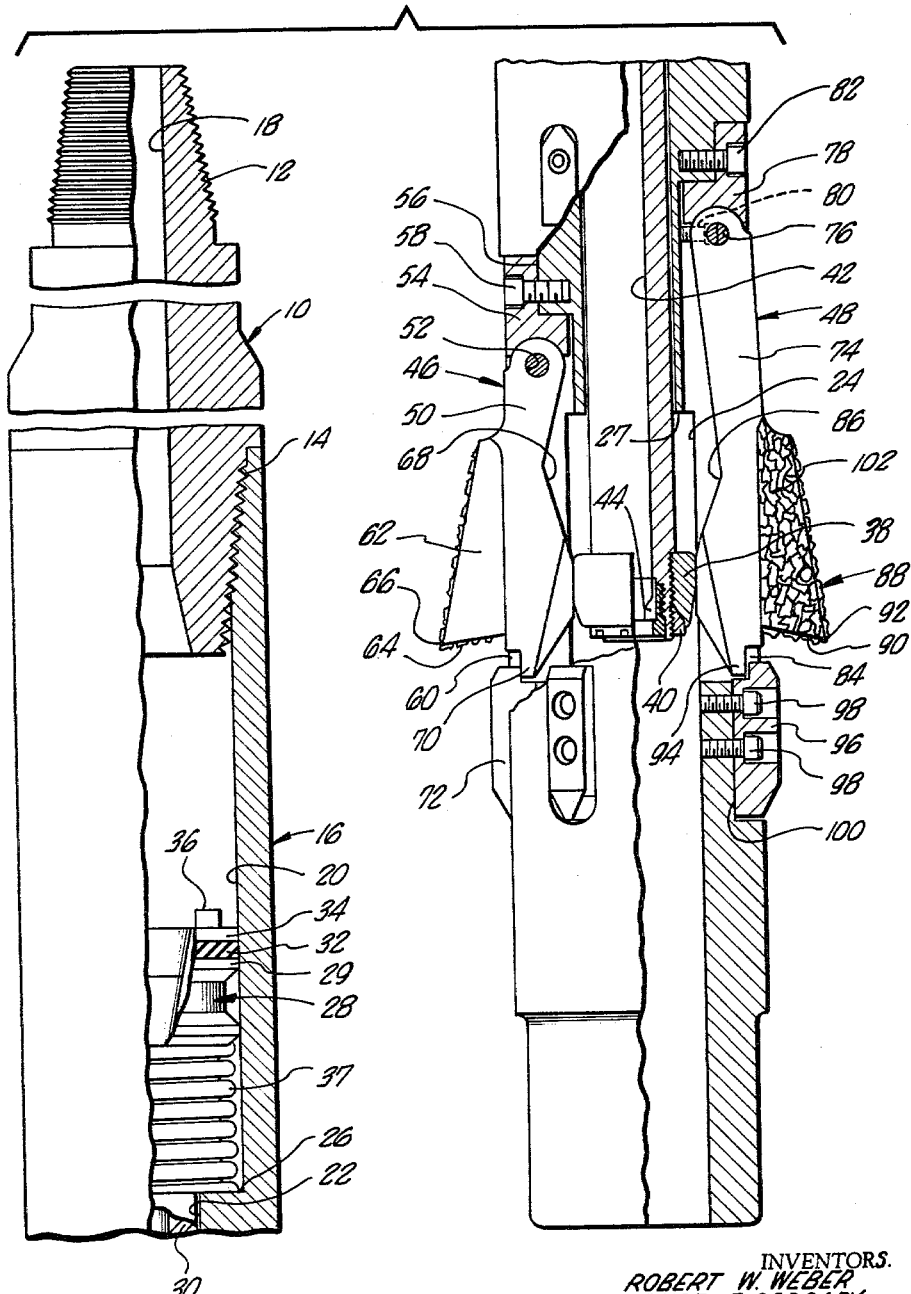
FIG. 1 is an elevational view, partially sectioned, the upper and lower portions being set out side by side, of one embodiment of the milling cutter of the present invention.

In the embodiment of the invention shown in FIG. 1, a top sub 10 includes an upper tool joint 12 which can be threadably engaged to drill pipe forming the drill string by which the milling cutter is lowered into the well bore. The top sub also includes a lower tool joint 14 threadably engaged to a tubular body 16 of the milling cutter of the present invention. A central passage 18 extends longitudinally through the top sub for flow of fluid.

The tubular body has a continuous central passage formed by an upper passage 20, an intermediate passage 22, and a lower passage 24. The diameter of intermediate passage 22 is smaller than the diameter of either upper passage 20 or lower passage 24, a shoulder 26 being formed in the tool body at the juncture of the upper and intermediate passages, and a shoulder 27 being formed in the tool body at the juncture of lower and intermediate passages.

A piston assembly 28, disposed in the passages of the tubular body as is hereinafter described, includes a piston head 29 and a piston stem 30. The piston head is disposed in the upper passage and has a diameter enabling slidable movement within the upper passage. The piston head includes piston packing 32 secured to the head body by a ring 34 and retaining screws of which one is shown in FIG. 1 and identified by reference character 36. The piston stem has a diameter such that it is slidably movable within the intermediate passage of reduced diameter, and is joined at its upper end within the upper passage to the piston head. The lower end of the piston stem extends into lower passage 24 of the tubular body. A compression spring 37 is placed around the portion of piston stem 30 in upper passage 20 so that the spring is compressibly positioned between the lower surface of piston head 29 and shoulder 26 formed in the tubular body.

A cam 38 is threadably fitted to the lower end of the piston and is retained in place by a cam lock nut 40. The diameter of the cam is substantially equal to the diameter of lower passage 24 so that it is slidably movable therein. The piston assembly has a central bore 42 extending through its length. At the lower end of the central bore, an orifice 44 is threadably inserted to provide an interior flow restriction within the bore.

In the embodiment shown in FIG. 1, three cutter arms, of which one cutter arm is shown and identified by reference character 46, constitute a first plurality of arms and are referred to herein as lead cutter arms. Three other cutter arms, of which one cutter arm is shown and identified by reference character 48 in FIG. 1, constitute a second plurality of arms and are referred to herein as follower cutter arms. It will be understood that the invention also contemplates a number of cutter arms comprising the first plurality and the second plurality, respectively, which number may be more or less than three. The number of cutter arms utilized is dependent in part upon the diameter of the tool body.

Lead cutter arm 46 consists of an arm body 50 supported at its upper end for pivotal movement on a hinge pin 52 retained in tubular body 16 by a pin-retaining screw (not shown). A lug 54 is inset in a recess 56 in the outer surface of the tubular body and retained therein by screws 58, of which one is shown in FIG. 1, so that it is substantially flush with the outer surface. The lug provides a bearing surface for the upper end of the cutter arm to absorb shock and thrust. The portion of the arm body depending from the hinge pin is accommodated within a longitudinal slot 60 in the tubular body. A cutter blade 62 roughly shaped in the form of a right triangle extends outwardly from the outer edge of the arm body and includes a cutting edge 64 constituting the base of the triangle and a cutting tip 66 constituting the outermost projection of the cutting edge. The inner edge of the arm body is shaped to provide a cam surface 68. The lower end of the arm body is notched to form an integral tab 70.

Cutter arm 46 is fitted within longitudinal slot 60 so that, while movable, only a small amount of fluid leakage between lower passage 24 and the outside of the tubular body occurs even in the absence of packing. An arm stop 72 is mounted in a recess (not shown) in the outer surface of the tubular body and engages tab 70 of the arm body to limit radially outward movement of the cutter arm.

The other two arms (not shown) constituting the first plurality of arms or lead cutter arms are identical in structure to cutter arm 46 and are mounted on the tubular body in the manner hereinbefore described with respect to cutter arm 46. The lead cutter arms are of substantially equal length and are supported on hinge pins equally spaced apart around the periphery of the tubular body, the hinge pins being secured to the tubular body, as previously described, at substantially the same level on the tubular body.

The follow cutter arms have the same structural elements as the lead cutter arms and are mounted as described with reference to the latter. Each of the other two follow cutter arms is idenical to follow cutter arm 48 shown in FIG. 1. Follow cutter arm 48 consists of an arm body 74 supported at its upper end for pivotal movement on a hinge pin 76 retained in the body by a pin-retaining screw 80 (shown by hidden lines). A lug 78 is secured to the tubular body by retaining screws 82, of which one is shown in FIG. 1. The arm body is accommodated within a longitudinal slot 84 in the tubular body and has an inner edge shaped to provide a cam surface 86. A cutter blade 88 extending outwardly from the outer edge of the arm body includes a cutting edge 90 and a cutting tip 92. The lower end of the arm body is notched to provide a tab 94 which engages an arm stop 96 secured by screws 98 in a recess 100 in the outer surface of the tubular body to limit outward radial movement of the follow cutter arm.

The other two arms (not shown) constituting the second plurality of arms or follow cutter arms are substantially the same length as follow cutter arm 48 and are supported on hinge pins equally spaced around the periphery of the tubular body, the hinge pins being secured to the body at substantially the same level on the tubular body.

The follow cutter arms are longer than the lead cutter arms and are mounted on hinge pins secured to the tubular body a distance above the hinge pins of the lead cutter arms such that the cutter blades and lower ends of all the arms are at substantially the same level. This embodiment is particularly adapted for tools of relatively small diameter since excessive weakening of the tubular body, as would occur if all the hinge pins were positioned at the same level around the periphery of the tubular body, is avoided. For reasons that will become more apparent from the description in connection with FIGS. 2–5 that follows, cam surface 68 of the lead cutter arms begins at a point above the beginning of cam surface 86 of the follow cutter arms.

The leading face, i.e., the face in the direction of rotation, of the cutter blades of each of the cutter arms includes a matrix material bonded to the blade face and containing cutting elements embedded therein, as generally indicated by reference character 102, with respect to follow cutter arm 48. While other cutting materials may be used, a material such as described in U.S. Patent No. 2,833,683 is presently preferred.

In FIG. 1, piston assembly 28 is shown in the position in which the milling cutter of the present invention is operative for cutting and milling, as will hereinafter be described. In the absence of fluid pressure, the piston assembly is in a raised position in which the upper surface of cam 38 abuts shoulder 27 formed in the tubular body. Upon application of pressure by surface pumps to pump a fluid such as gas, water or drilling mud down through the drill string, the fluid successively passes through passage 18 of the top sub, upper passage 20 of the tubular body, and central bore 42 of the piston assembly. The fluid is discharged from lower passage 24 through the open bottom end of the tubular body. The flow of fluid through orifice 44 in central bore 42 of the piston assembly produces a pressure differential causing downward movement of the piston assembly and compression of spring 37 between the piston head and shoulder 26. The piston assembly then attains the position shown in FIG. 1.

The operation of the apparatus of the present invention will be better understood by reference to FIGS. 2–5, in which appear schematic representations of the embodiment of the apparatus shown in detail in FIG. 1. The same reference characters are used to identify like parts in FIGS. 2–5. With reference to FIGS. 2–5, the milling cutter includes a tubular body 104 defining a central passage 106, and a cam 108 slidably movable in passage 106 and joined to a piston stem 110 of a piston assembly. A lead cutter arm 112 depends from a hinge pin 114 and includes a cam surface 116 and a cutter blade 118. A follow cutter arm 120 depends from a hinge pin 122 and includes a cam surface 124 and a cutter blade 126.

As shown in FIGS. 2–5, the apparatus of the present invention is disposed in a casing 128 including an inner surface 130 and an outer surface 132. The casing is in a well bore 134.

With particular reference to FIG. 2, both the lead cutter arms and the follow cutter arms are in a retracted position so the arms are substantially within the outer circumference of tubular body 104. The milling cutter is in the position shown in FIG. 2 as it is lowered at the end of a drill string through casing 128. Cam 108 is maintained out of engagement with the cam surfaces of the cutter arms by the biasing force of a compression spring, as has been particularly shown and described with reference to FIG. 1.

When the milling cutter reaches a predetermined depth, fluid pressure is applied to force the piston assembly, including cam 108, downwardly as previously described. Cam 108 of the piston assembly engages cam surface 116 of the lead cutter arms and expands the arms outwardly from the tubular body to cause cutter blade 118 to engage inner surface 130 of the casing, as shown with reference to lead cutter arm 112 in FIG. 3. It will be noted that in the position shown in FIG. 3, cam 108 has not engaged cam surface 124 of the follow cutter arm, and the cutter blade of the follow cutter arm is not in engagement with the casing. Upon rotation of the drill string and the attached milling cutters the cutting blades of the lead cutter arms begin to cut through the inner surface of casing 128.

As the cutting blades of the lead cutter arms penetrate into the casing wall, cam 108 is forced downwardly by the applied fluid pressure until it engages cam surface 124 of the follow cutter arms. This is particularly shown in FIG. 4. The cam surfaces of the lead cutter arms and the follow cutter arms are shaped so that the cam surface of the lead cutter arms is engaged prior to engagement between the cam and the cam surface of the follow cutter arm. It is also preferred that the position of the cam surfaces be such that engagement of the cam surface of the follow cutter arms does not occur until just at the point of cut-through of the casing. In this manner, the cutting edges of the follow cutter arms initially engage the casing to provide a lagging effect at the time when the cutting edges of the lead cutter arms completely cut through the casing.

The continued downward movement of the piston assembly and cam 108 as the cutting progresses produces a positioning of the cutter arms as shown in FIG. 5. In this position, cutting through the casing is completed and the cutting edges of both arms are in position for milling of the casing. While not shown in FIG. 5, no further outward movement of the cutter arms occurs since, as shown in FIG. 1, tabs on the arm bodies engage stops secured to the tubular body. The milling of the casing is accomplished by rotation of the tool by means of the drill string so that the cutting particles embedded in the matrix mill the now exposed edge of the casing. The milling operation is continued until a predetermined amount of casing has been milled to provide a section of a desired length.

When the cutting and milling operation has been completed, the applied fluid pressure is removed so that the piston is urged upwardly by the compression spring (see FIG. 1) with consequent upward movement of the cam and disengagement between the cam and the cam surfaces of the cutting arms. The cutting arms are therefore free to return to the retracted position previously described and shown in FIG. 2.

In the embodiment of the tool shown in FIGS. 1–5, the hinge pins supporting the first plurality of arms or lead cutter arms are positioned below the hinge pins supporting the second plurality of arms or follow cutter arms. While this structure is preferred in a relatively small diameter tool to avoid excessive weakening of the tool body, as previously described, it will be understood that in relatively large diameter tools, where the problem of weakening of the tool body is not critical, all of the hinge pins may be secured at the same level and the cutter arms be formed to have equal lengths. Within the scope of the invention, however, the cam surfaces would be formed so that the cam surface of one plurality of arms is engaged by downward movement of the piston prior to engagement of the cam surfaces of the second plurality of arms. The advantages of the invention, previously described, would be accrued by this embodiment.

Other modifications, as for example the location and type of flow restricting device by which a pressure differential to drive the piston is created, may be made within the scope of the invention as herein described.

We claim:

1. An apparatus for cutting and milling a tubular conduit disposed in a well bore comprising:
   (a) a tubular body adapted to be secured to a drill string and having a passage;
   (b) a piston reciprocably movable within the passage;
   (c) a first plurality and a second plurality of cutter arms, each secured to the tubular body and adapted to occupy an retracted position and an expanded position;
   (d) openings in the tubular body accommodating the arms so that a portion of each arm extends inwardly into the passage;
   (e) each arm having means engageable by the piston,
      (i) said means on the first plurality and the second plurality of cutter arms being shaped relative to each other so that movement of the piston successively engages said means to produce outward movement of the first plurality of arms to the expanded position to operatively engage the tubular conduit at an initial preselected level prior to outward movement of the second plurality of arms to the expanded position to operatively engage the tubular conduit at substantially the same preselected level.

2. An apparatus for cutting and milling a tubular conduit disposed in a well bore comprising:
   (a) a tubular body adapted to be secured to a drill string and having a passage;
   (b) a piston reciprocably movable within the passage;
   (c) a first plurality and a second plurality of cutter arms, each secured at one end to the tubular body for pivotal movement of the other end of the arm radially outwardly from said body;
   (d) openings in the tubular body accommodating the arms so that a portion of each arm extends inwardly into the passage;
   (e) each arm having means engageable by the piston,
      (i) said means on the first plurality and the second plurality of cutter arms being shaped relative to each other so that movement of the piston successively engages said means to produce radial outward movement of the other ends of the first plurality of arms to operatively engage the tubular conduit at an initial preselected level prior to radial outward movement of the other ends of the second plurality of arms to operatively engage the tubular conduit at substantially the same preselected level.

3. An apparatus for cutting and milling a tubular conduit disposed in a well bore comprising:
   (a) a tubular body adapted to be secured to a drill string and having a central passage;
   (b) a piston reciprocably movable within the central passage;
   (c) a first plurality of depending cutter arms, each secured at one end to the periphery of the tubular body at a first level for pivotal movement of the other end of the arm radially outwardly from said body;
   (d) a second plurality of depending arms, each secured at one end to the periphery of the tubular body at a second level for pivotal movement of the other end of the arm radially outwardly from said body;
   (e) the other ends of the arms of the first plurality and the second plurality being at substantially the same level with respect to the tubular body;

(f) openings in the tubular body accommodating the arms so that a portion of each arm extends inwardly into the central passage;

(g) each arm having means engageable by the piston,
  (i) said means on the first plurality and the second plurality of cutter arms being shaped relative to each other so that movement of the piston successively engages said means to produce radial outward movement of the other ends of the first plurality of arms to operatively engage the tubular conduit at an initial preselected level prior to radial outward movement of the other ends of the second plurality of arms to operatively engage the tubular conduit at substantially the same preselected level.

4. An apparatus for cutting and milling a tubular conduit disposed in a well bore comprising:
  (a) a tubular body adapted to be secured to a drill string and having a passage;
  (b) a piston reciprocably movable within the passage;
  (c) a first plurality and a second plurality of cutter arms, each secured at one end to the tubular body for pivotal movement of the other end of the arm radially outwardly from said body and disposed in slots in the tubular body so that a portion of each arm extends inwardly into the passage, each arm having
    (i) means at its other end for cutting and milling tubular conduits,
    (ii) a cam surface on the portion of the arm extending inwardly into the passage to be operatively engaged by the piston;
  (d) the cam surfaces of the first plurality and the second plurality of cutter arms being shaped relative to each other so that movement of the piston successively engages said cam surfaces to produce radial outward movement of the other ends of the first plurality of arms so that their cutting and milling means operatively engage the tubular conduit at a preselected level prior to radial outward movement of the other ends of the second plurality of arms so that their cutting and milling means operatively engage the tubular conduit at substantially the same preselected level, said engagement of the second plurality being before the cutting and milling means of the first plurality cuts through the tubular conduit.

5. An apparatus for cutting and milling a tubular conduit disposed in a well bore comprising:
  (a) a tubular body adapted to be secured in a vertical position to a drill string and having a central passage;
  (b) a piston reciprocably movable within the central passage;
  (c) a first plurality and a second plurality of depending cutter arms, each secured at one end to the tubular body for pivotal movement of the other end of the arm radially outwardly from said body to engage the tubular conduit in cutting and milling relationship, and disposed in slots in the tubular body so that a portion of each arm extends inwardly into the passage, each arm having
    (i) means at its other end for cutting and milling tubular conduits,
    (ii) a cam surface on the portion of the arm extending inwardly into the passage to be operatively engaged by the piston;
  (d) the cam surfaces of the first plurality and the second plurality of cutter arms being formed so that the cam surfaces of the first plurality begin to extend inwardly into the passage for engagement by movement of the piston at a level above where the cam surfaces of the second plurality of arms begin to extend inwardly in the passage for engagement by movement of the piston,
    (i) said cam surfaces being shaped relative to each other so that the cutting and milling means of the second plurality of arms first engages the tubular conduit at a preselected level before the cutting and milling means of the first plurality of arms cuts through the tubular conduit at substantially the same preselected level.

6. An apparatus for cutting and milling a tubular conduit disposed in a well bore comprising:
  (a) a tubular body adapted to be secured to a drill string and having a passage;
  (b) a piston reciprocably movable within the passage;
  (c) a first plurality and a second plurality of arms, each secured at one end to the tubular body for pivotal movement of the other end of the arm radially outwardly from said body,
    (i) said other end of the arms of the first plurality and the second plurality being at substantially the same level with respect to the tubular body;
  (d) openings in the tubular body accommodating the arms so that a portion of each arm extends inwardly into the passage;
  (e) means at the other end of each depending arm for cutting and milling tubular conduits;
  (f) a cam surface on the portion of each arm extending inwardly into the passage to be operatively engaged by the piston;
  (g) the cam surfaces of the first plurality and the second plurality of cutter arms being shaped relative to each other so that movement of the piston successively engages said cam surfaces to produce radial outward movement of the other end of the first plurality of arms so that their cutting and milling means operatively engage the tubular conduit at a preselected level prior to radial outward movement of the other end of the second plurality of arms so that their cutting and milling means operatively engage the tubular conduit at substantially the same preselected level, said engagement of the second plurality being before the cutting and milling means of the first plurality cuts through the tubular conduit.

7. An apparatus for cutting and milling a tubular conduit disposed in a well bore comprising:
  (a) a tubular body adapted to be secured to a drill string and having a central passage;
  (b) a piston reciprocably movable within the central passage;
  (c) a first plurality of depending cutter arms, each secured at one end to the periphery of the tubular body at a first level for pivotal movement of the other end of the arm radially outwardly from said body;
  (d) a second plurality of depending cutter arms, each secured at one end to the periphery of the tubular body at a second level for pivotal movement of the other end of the arm radially outwardly from said body;
  (e) the other end of the arms of the first plurality and the second plurality being at substantially the same level with respect to the tubular body;
  (f) openings in the tubular body accommodating the arms so that a portion of each arm extends inwardly into the central passage;
  (g) means at the other end each depending arm for cutting and milling tubular conduits;
  (h) a cam surface on the portion of each arm extending inwardly into the passage to be operatively engaged by the piston;
    (i) the cam surfaces of the first plurality and the second plurality of cutter arms being shaped relative to each other so that movement of the piston successively engages said cam surfaces to produce radial outward movement of the other end of the first and second pluralities of arms so that the cutting and milling means of the arms of each plurality operatively and successively engage the tubular conduit at substantially the same initial preselected level, said engagement of the second plurality being before the cutting and milling means of the first plurality cuts through the tubular conduit.

8. Apparatus in accordance with claim 7 wherein the first plurality and second plurality of cutter arms each consist of three arms.

References Cited by the Examiner
UNITED STATES PATENTS

| | | | |
|---|---|---|---|
| 2,130,580 | 9/38 | Buckles | 166—55.8 |
| 2,299,528 | 10/42 | Conner | 166—55.8 |
| 2,690,897 | 10/54 | Clark | 166—55.8 X |
| 2,922,627 | 1/60 | Kammerer | 166—55.8 |

CHARLES E. O'CONNELL, *Primary Examiner.*